UNITED STATES PATENT OFFICE.

RAYMOND C. BENNER AND HARRY F. FRENCH, OF FREMONT, OHIO, ASSIGNORS, BY MESNE ASSIGNMENTS, TO NATIONAL CARBON COMPANY, INC., A CORPORATION OF NEW YORK.

ELECTRIC BATTERY.

1,316,760.     Specification of Letters Patent.     Patented Sept. 23, 1919.

Continuation of application, Serial No. 123,856, filed October 5, 1916. This application filed January 26, 1917. Serial No. 144,618.

No Drawing.

*To all whom it may concern:*

Be it known that we, RAYMOND C. BENNER and HARRY F. FRENCH, citizens of the United States, and residents, respectively, of Fremont, in the county of Sandusky and State of Ohio, and Fremont, in the county of Sandusky and State of Ohio, have invented a certain new and useful Improvement in Electric Batteries, of which the following is a full, clear, and exact description.

This invention relates to electric batteries and is a continuation of our application filed October 5, 1916, Serial No. 123,856.

The invention is especially applicable to alkaline cells having a positive electrode usually of zinc and a negative electrode of powdered copper oxid inclosed in a perforated container. The negative electrode may consist of a block of molded copper oxid, but the electrochemical action is the same. The complete battery consists of a jar containing an alkaline electrolyte, such as sodium hydroxid, usually with an appropriate cover from which the two electrodes are suspended.

We have found that sulfur compounds have the remarkable property of materially raising the voltage of the copper oxid cell, and also, in a majority of cases, of increasing the service life. The soluble sulfids exhibit both of these effects, such soluble sulfids including ammonium sulfid, hydrogen sulfid, the sulfids of the alkaline metals, sodium, potassium, rubidium, caesium and lithium, and the sulfids of the alkaline earth metals, barium, calcium, strontium and magnesium.

Practically all the insoluble sulfids, when prepared and purified properly, raise the voltage of the copper oxid cell, and a considerable number of these also increase the service life, others being neutral and still others negative in this respect. A partial list of the insoluble sulfids of the metals and non-metals which raise the voltage includes:

Cupric sulfid ($CuS$), silver sulfid ($Ag_2S$), zinc sulfid ($ZnS$), cadmium sulfid ($CdS$), mercuric sulfid ($HgS$), boron trisulfid ($B_2S_3$), aluminum sulfid ($Al_2S_3$), silicon sulfid ($SiS_2$), titanium sesquisulfid ($Ti_2S_3$), stannous sulfid ($SnS$), stannic sulfid ($SnS_2$), cerous sulfid ($Ce_2S_3$), vanadium pentasulfid ($V_2S_5$), arsenous sulfid ($As_2S_3$), arsenic pentasulfid ($As_2S_5$), arsenic disulfid ($As_2S_2$), antimony trisulfid ($Sb_2S_3$), antimony pentasulfid ($Sb_2S_5$), bismuth sulfid ($Bi_2S_3$), chromic sulfid ($Cr_2S_3$), molybdenum disulfid ($MoS_2$), ferrous sulfid ($FeS$), ferric sulfid ($Fe_2S_3$), iron disulfid ($FeS_2$), nickel monosulfid ($NiS$), cobaltous sulfid ($CoS$), phosphorus sesquisulfid ($P_4S_3$), sulfur monochlorid ($S_2Cl_2$), sulfur bromid ($S_2Br_2$), sulfur iodid ($S_2I_2$).

Cuprous sulfid $Cu_2S$, as far as we have been able to find out, and lead sulfid, $PbS$, have no effect on the voltage of the cell when mixed with copper oxid in accordance with this invention even though purified carefully. There may be conditions, however, under which these would possess the voltage raising characteristic.

All the alkaline and alkaline earth metals, and also the ammonium radical, have the property of combining with hydrogen and sulfur to form hydrosulfids, for example $KSH$, and with varying excess amounts of sulfur to form polysulfids, for example $K_2S_2$, $K_2S_3$, etc. We have found that the hydrosulfids and polysulfids are similar to the normal soluble sulfids in raising the voltage and increasing the service life of the cell.

Again, we have found that double sulfids and organic sulfids possess the voltage raising characteristics and as examples of the former may mention the double sulfids of ammonium and tin, $(NH_4)_2SnS_3$; ammonium and antimony, $(NH_4)_3SbS_3$, $(NH_4)_3SbS_4$; ammonium and arsenic $(NH_4)_3AsS_3$, $(NH_4)_3AsS_4$; ammonium and copper, $NH_4CuS_2$, and mercury and sodium, $Hg(NaS)_2$.

As examples of organic sulfur compounds previously referred to, the following may be given: Phenylsulfocarbamid, thiosinamin, thioacetic acid, thiourea, allyl mustard oil, hydrazin sulfate, thiocarbanilid, alphanaphthylamin-sulfate and carbon disulfid.

There are various processes of incorporating the sulfids and sulfur compounds in the cell to produce the desired reaction between them and the oxid. In case of soluble compounds a preferable one is to allow the powdered copper oxid to stand in water, sodium hydroxid or other solution of the sulfid or other compound, until the copper oxid mass is permeated with the solution. The oxid is allowed to drain and, with or without drying, placed in the perforated container to be used in the cell in the usual way.

Obviously some of the sulfur compounds could be dissolved in the sodium hydroxid electrolyte in the battery jar, and then the copper oxid added in the usual way to complete the cell. To minimize the detrimental action upon the zinc and the consequent modification of the voltage raising material, it is desirable in this latter case to omit the zincs until a considerable time has elapsed to permit any possible reaction to take place between the depolarizer and the sulfur compound. While this produces the desired effect to some degree, it is not the preferred process, for we have found that it is in general not as convenient, efficient or economical as the other methods which we have described. Other solvents than those mentioned may be used without departing from the spirit of the invention.

As an alternative method the powered sulfur compounds may be mixed with powdered oxid and then placed in the perforated container, ready for assembling in the cell, and this is the preferable way when insoluble sulfids are used.

The amount of sulfids or other sulfur compounds incorporated in the depolarizing mass, is capable of being varied greatly, and the invention is therefore not to be restricted to any definite proportion. However, by way of example, it may be stated that with a standard copper oxid cell having about 1000 grams sodium hydroxid and 1050 grams of copper oxid, from 1 to 250 grams of sulfid have been used with good results.

In practice we prefer to use the sulfids or polysulfids of sodium, the sulfids of copper (cupric), zinc, cadmium or bismuth, as these are in general the most suitable.

Having described our invention, what we claim is:

1. In electric batteries, a negative element containing a mixture of copper oxid and a sulfid adapted to increase the voltage when used in the electric cell.

2. In electric batteries, an alkaline electrolyte, a sulfid adapted to increase the voltage, a positive electrode and a negative element containing copper oxid.

3. In electric batteries, an alkaline electrolyte, a zinc-copper oxid couple therein and a sulfid in the copper oxid adapted to increase the voltage of said couple.

In testimony whereof we hereunto affix our signatures.

RAYMOND C. BENNER.
HARRY F. FRENCH.